(12) United States Patent
Bruington

(10) Patent No.: US 8,387,602 B1
(45) Date of Patent: Mar. 5, 2013

(54) FISHING SPEARGUN

(76) Inventor: Robert Kevin Bruington, Largo, FL (US)

( * ) Notice: Subject to any disclaimer, the term of this patent is extended or adjusted under 35 U.S.C. 154(b) by 220 days.

(21) Appl. No.: 12/758,878

(22) Filed: Apr. 13, 2010

Related U.S. Application Data

(60) Provisional application No. 61/172,317, filed on Apr. 24, 2009.

(51) Int. Cl.
*F41B 7/04* (2006.01)

(52) U.S. Cl. .......................................... 124/20.3; 124/31

(58) Field of Classification Search ....... 43/6; 124/20.3, 124/22, 25, 31, 35.1, 40
See application file for complete search history.

(56) References Cited

U.S. PATENT DOCUMENTS

| | | | | |
|---|---|---|---|---|
| 3,490,429 A | * | 1/1970 | Benedict | 124/35.1 |
| 3,773,026 A | * | 11/1973 | Romero | 124/22 |
| 4,359,999 A | * | 11/1982 | Garofalo | 124/80 |
| 4,895,128 A | * | 1/1990 | Okada | 124/22 |
| 5,904,132 A | * | 5/1999 | Biller | 124/22 |

* cited by examiner

*Primary Examiner* — John Ricci
(74) *Attorney, Agent, or Firm* — David Kiewit

(57) ABSTRACT

A band-powered speargun has a release mechanism incorporating a line-drop feature for releasing a coiled line attached to a spear. An approach to attaching the line to the spear involves a linking ring having a size selected so that the ring passes over a protective cone near the spear tip and is captured by an element protruding outward from the spear shaft. The protective cone also shields hinged barbs from impact damage. The gun may also incorporate a muzzle kill spike and a separate hand-held kill spike that is normally stored in a specially designed cavity in the speargun grip.

2 Claims, 9 Drawing Sheets

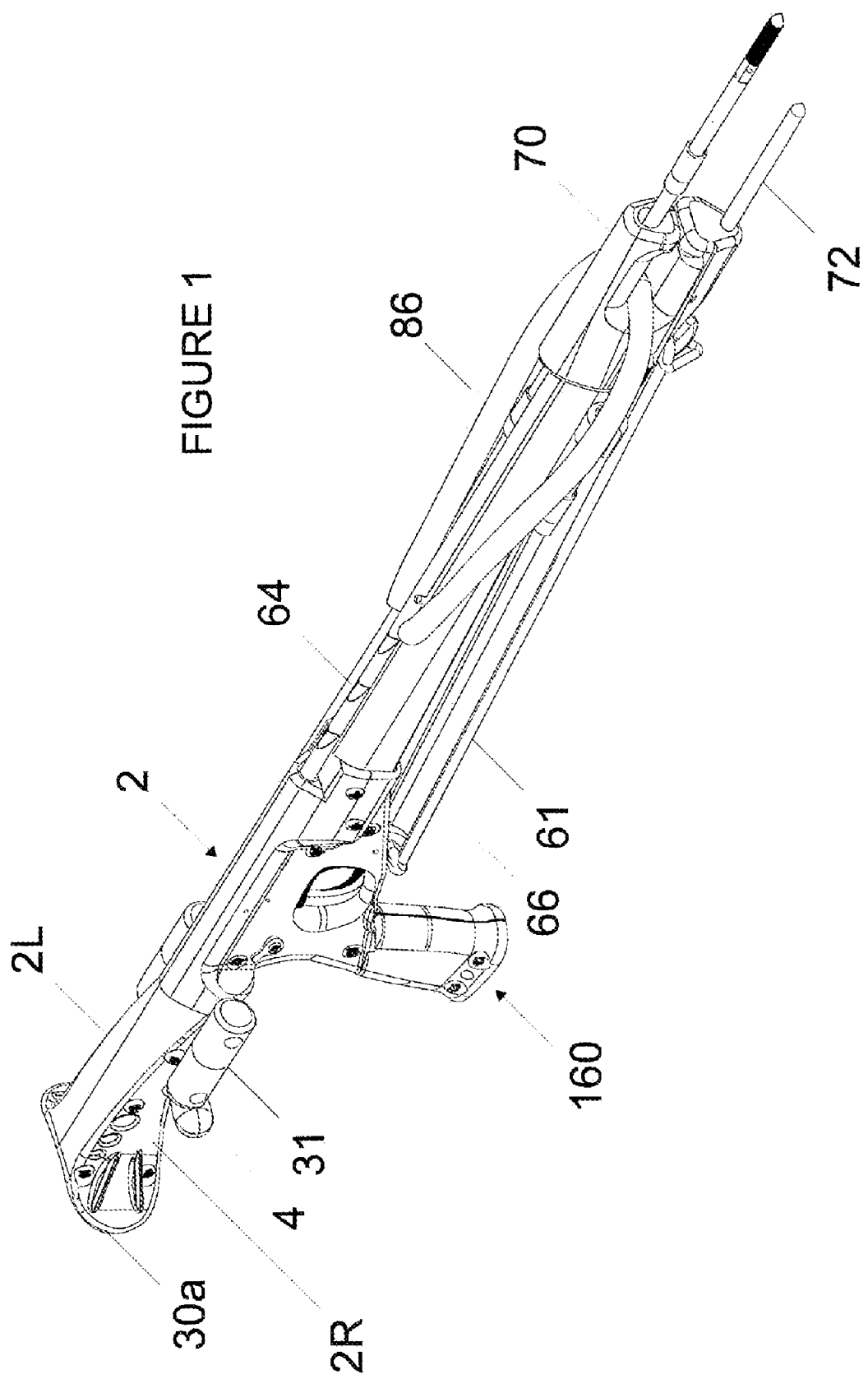

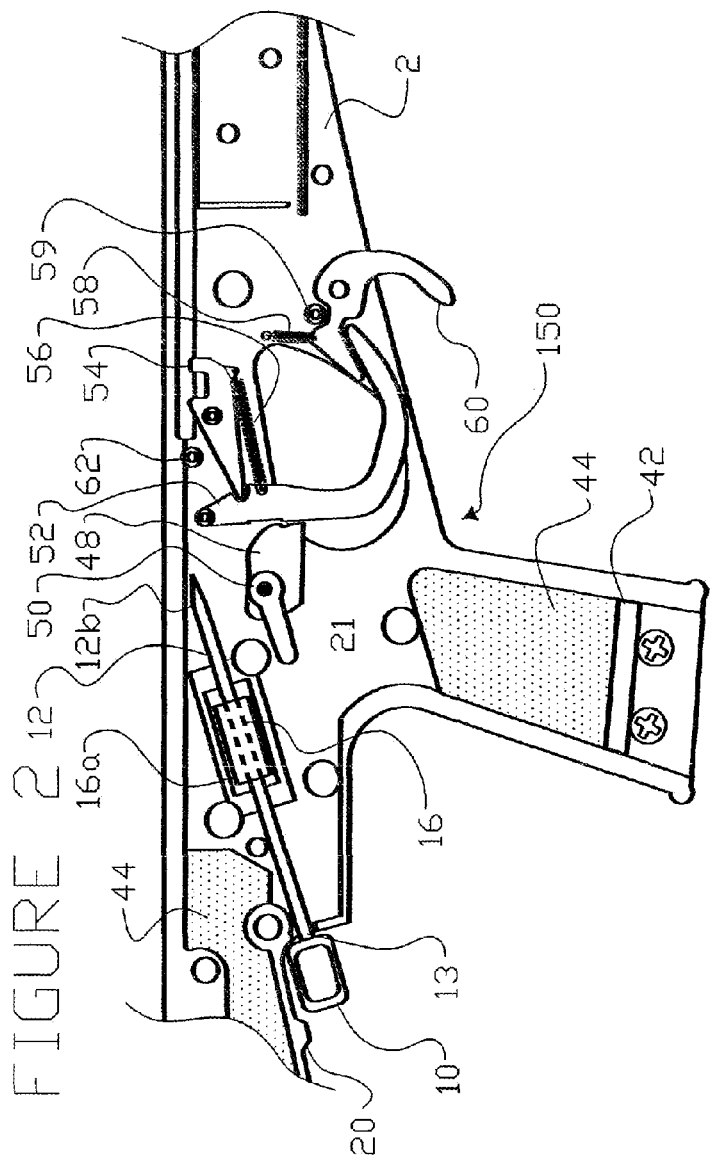

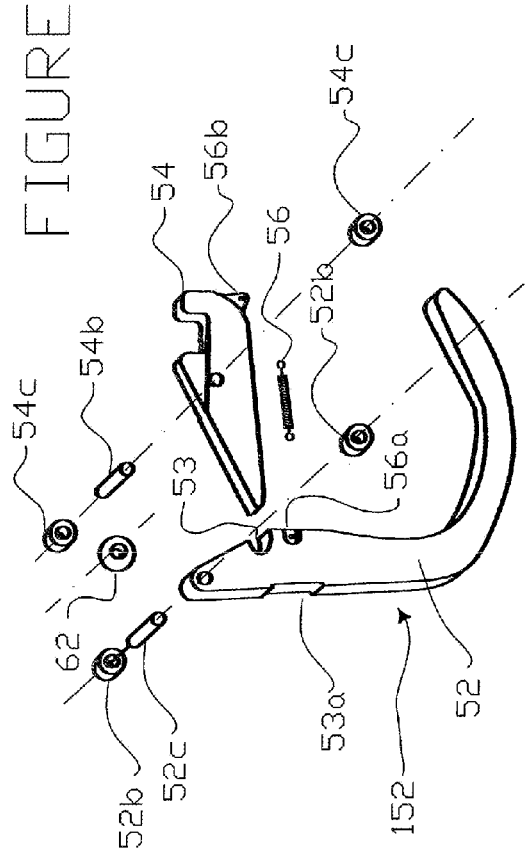

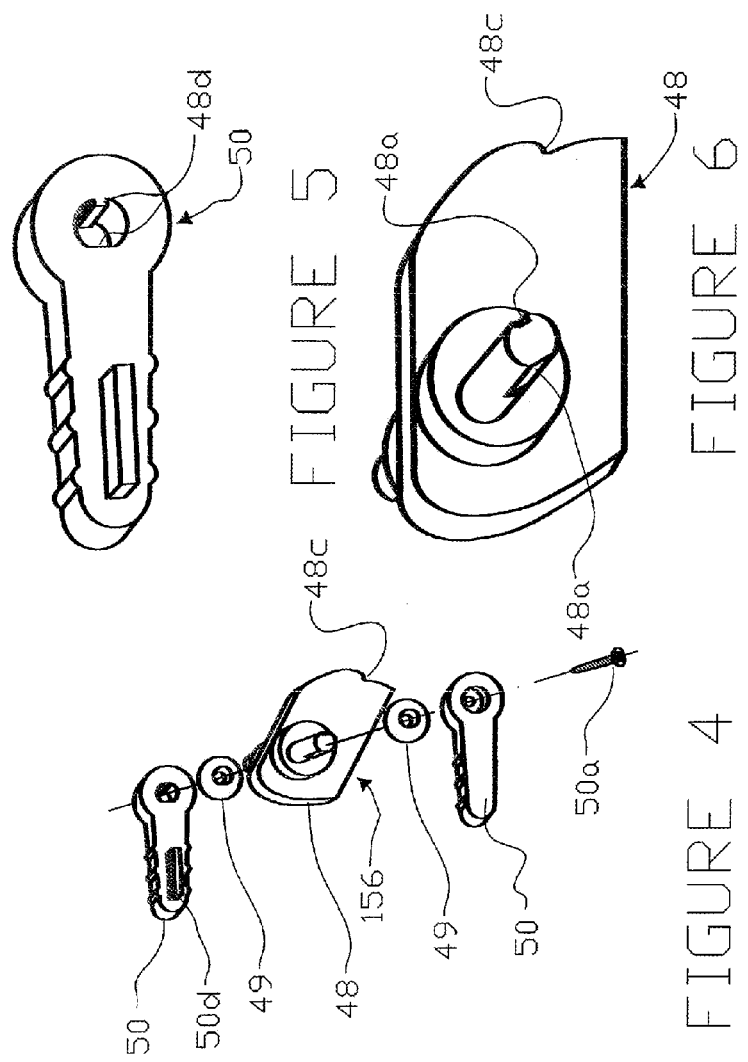

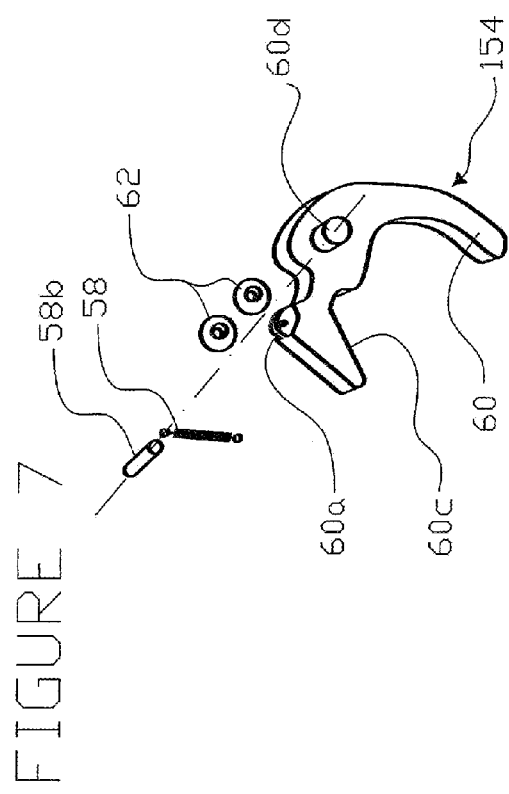

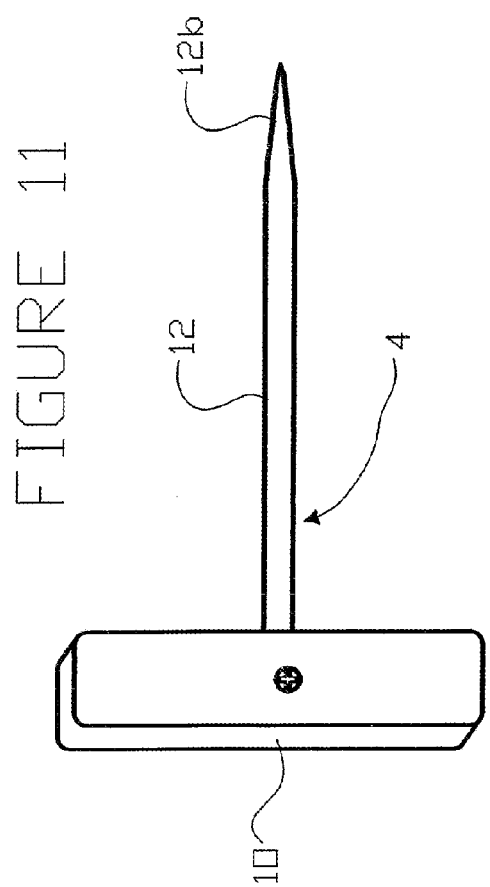

FISHING SPEARGUN

BACKGROUND OF THE INVENTION

1. Field of the Invention

The invention relates generally to spearguns used for fishing.

2. Background Information

Spearguns are primarily made in two basic types, band powered and pneumatic. Band powered means the spearshaft is propelled forward by heavy latex bands which produce approximately 50 to 125 lbs of thrust per band. Some band powered guns use as many as six bands per gun. Pneumatic spearguns use a compressed air piston to propel the spearshaft forward. Band powered spearguns typically have a grip or handle, a trigger mechanism, a barrel or stock of wood or metal, a muzzle, a butt pad, a spearshaft, a line tether which attaches to the spearshaft, and latex bands to propel the spearshaft.

Band powered spearguns have remained largely unchanged for the past forty years. Most of the design improvements for the past forty years have been focused on the trigger mechanism. Many speargun builders have made improvement to their trigger mechanisms using improved geometry, innovative designs, improved mating surfaces of the trigger and the sear/latch bar, 3D computer design, modern cutting technology, and higher quality materials. These improvements have enabled the trigger mechanisms to hold more power while maintaining a smooth trigger pull and perform more reliably and safely.

Some spearguns are made using one solid and continuous piece of wood. This is typically called a "one piece" speargun. The mechanical components are typically installed in the wood using a mortise, dado, slot, or pockets. Grips/handles are usually screwed on the outer body and flush mounted. Other spearguns use a grip assembly (usually plastic) using three main body parts. A grip/handle assembly, a wood barrel, and a short wood butt stock. The barrel typically inserts into socket molded into the front of the grip assembly and the wood butt stock inserts into a socket molded into the rear of the grip assembly. This is typically called a three piece speargun. Typically, a plastic muzzle is slipped over the front end of the barrel and a plastic butt pad is slipped on the rear end of the wood butt stock. This forms the main body of the speargun.

BRIEF SUMMARY OF THE INVENTION

One aspect of the invention is that it provides a release mechanism for a speargun. This release mechanism is movable between a cocked state and a released state and comprises a trigger, a latch bar and a line drop member. The arctuate trigger has a captive end pivotally attached to a grip panel and a free end that may frictionally engage a line drop member. The latch bar is also pivotally attached to the grip and has a first end captured by the trigger when the mechanism is in the cocked state. The second end of the latch bar protrudes outwardly from a portion of the grip when the mechanism is in the cocked state so that it can engage a spear. The arctuate line drop member is pivotally attached to the grip. When the release mechanism is cocked, a first end of the line drop member engages the free end of the trigger and a second end depends below the grip so that a line can be wrapped around it.

A preferred embodiment of a speargun design provides a band powered speargun with a grip assembly and a wood barrel. This creates a "two piece" speargun. The butt pad, trigger, sear, safety, line drop, and barrel mounting socket are all housed in a two sided grip assembly. Once assembled, the grip panels become a very strong, durable, reliable, and stable assembly. Here, the term "uni-grip" is interpreted to mean: the butt pad, butt stock, trigger, sear, safety, and line drop are all housed in "one" assembly. The barrel installs in the uni-grip socket located at the front of the uni-grip assembly and the muzzle mounts on the front end of the wood barrel. The uni-grip assembly, the barrel, and the muzzle make up the main body of this speargun.

There are many advantages to my uni-grip design. For instance: once opened, the two piece grip panels allow full and easy access to all internal working components of the speargun. This easy access allows for quicker assembly, parts replacement, repairs, or service. A person with very basic mechanical skills can repair or replace any component in the grip assembly using only a Phillips head screwdriver and a pair of needle nose pliers. The Phillips head screwdriver is used to open the grip assembly. Once open, all mechanical components simply drop into bosses molded into the grip panels.

The drop-in boss design allows the end user to replace parts, make repairs or perform periodic maintenance. This will eliminate or greatly reduce the need for the end user to return the speargun to the factory for warranty or service. Spearguns can be costly to ship, require a box which is hard to find, and could be easily damaged or destroyed during shipment. Loss of use for the end user is also eliminated or greatly reduced because the design enables them to make repairs or perform basic maintenance themselves.

Another advantage of the two piece grip panels is that a guide hole and pocket can be molded in each of the grip panels to house a rubber tube for holding a grip kill spike.

Thus, another aspect of the invention is that if provides spearfishing apparatus comprising, in combination, a speargun and a kill spike. Here, the kill spike comprises an elongate metal spike having a first, sharpened end and a handgrip, which may be a T-handle, attached to the second end. In this combination the speargun comprises a grip portion having an elastomeric tube captured within it and aligned with a spike insertion hole in an external surface of the grip portion. The grip portion also has a retention boss formed on its external surface. The retention boss is spaced apart from the insertion hole by a selected distance so that when the grip kill spike is fully inserted into the elastomeric tube the handgrip bears on the retention boss, which holds the kill spike in a stored position with its sharpened end enclosed within the grip.

Yet another aspect of the invention is that it provides apparatus for attaching a spear to a spearfishing gun by means of a line. The spear has a point at one end, and is equipped with at least one barb member that is pivotally attached adjacent a first of two ends thereof to the spear shaft. A protective member having a low flow resistance is provided and is attached to the shaft between the point and the barb or barbs. A stopping member is attached to the spear shaft at a selected position further away from the point than the barb or barbs and extends outward from the axis of the spear further than does the protective member. A linking element, or quick slide adapter, has an attachment eye having a diameter selected so that the eye can pass over the protective member but not over the stopping member. This linking element also has an attachment point for the line.

The protective member, which may be conical in shape, protects the spear barbs and rivet pin from impact damage, improves hydrodynamic flight, and improves penetration when installed on a speartip or spearshaft.

The quick slide adapter allows a diver to quickly connect or disconnect a line cord from the spearshaft while under water. The quick slide adapter eliminates the often cumbersome process of opening, attaching, and closing a conventional disconnect clip which can be difficult when wearing heavy dive gloves. The quick slide adapter has no moving parts, has low drag, is made of heavy stainless steel, and is very durable and reliable.

The stopping member, which is preferably attached to a spear shaft behind the protective member may be configured as a bullet slide ring that is conical on the leading edge to make it more hydrodynamic. The bullet slide ring is slightly larger in diameter than the quick slide adapter and thus the bullet slide ring acts as a terminal stop for the quick slide adapter. One end of the line cord is attached to the quick slide adapter and the opposite end of the line cord is attached to the muzzle of the speargun.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE SEVERAL VIEWS OF THE DRAWING

FIG. 1 is a perspective view of a speargun of the invention.

FIG. 2 is a detail elevational view of a speargun grip panel having various components attached thereto.

FIG. 3 is an exploded detail view of the trigger and latch bar subassembly of FIG. 2.

FIG. 4 is an exploded detail view of a safety mechanism of FIG. 2.

FIG. 5 is a magnified view of the safety lever shown in FIG. 4.

FIG. 6 is a magnified view of the safety cam shown in FIG. 4.

FIG. 7 is an exploded detail view of a line drop subassembly of FIG. 2.

FIG. 11 is a perspective view of a grip kill spike insertable into the speargun of FIG. 1.

DETAILED DESCRIPTION OF A PREFERRED EMBODIMENT

Figure 8:
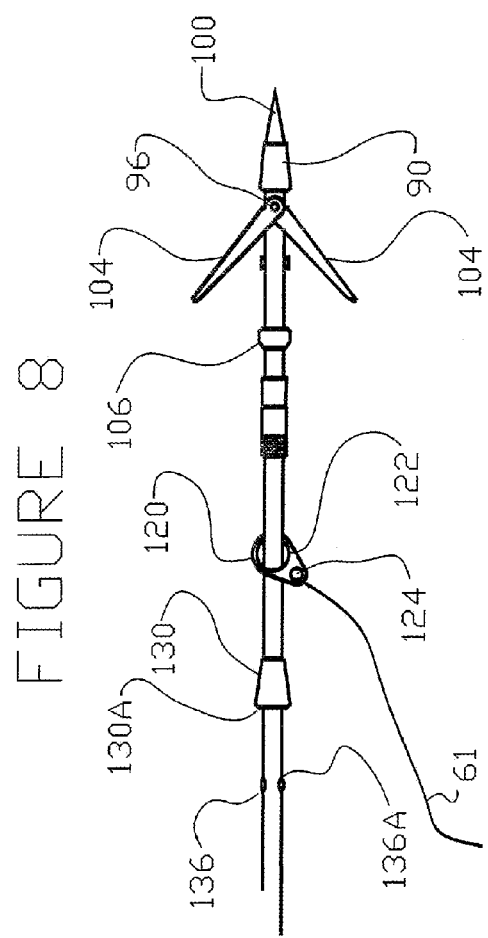
FIG. 8 is a side view of a first fishing spear and line connection arrangement of the invention.
Figure 9:
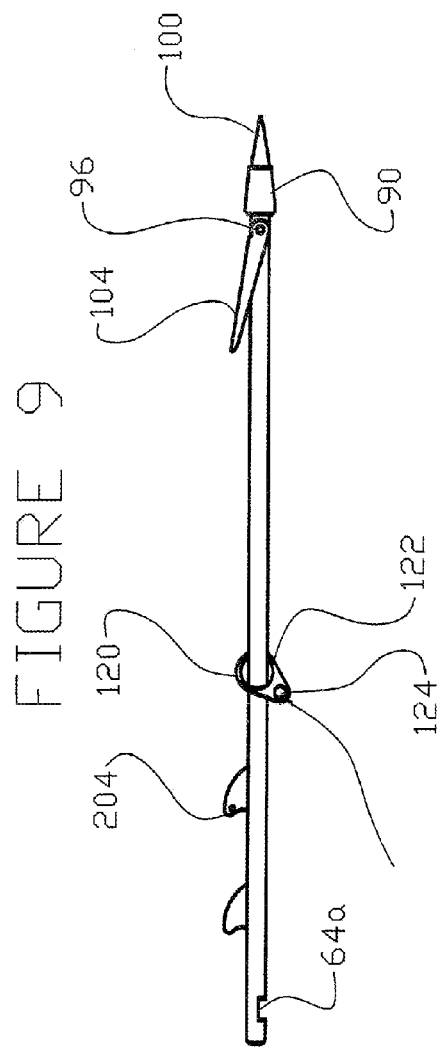
FIG. 9 is a side view of a second fishing spear and line connection arrangement of the invention.
Figure 10:
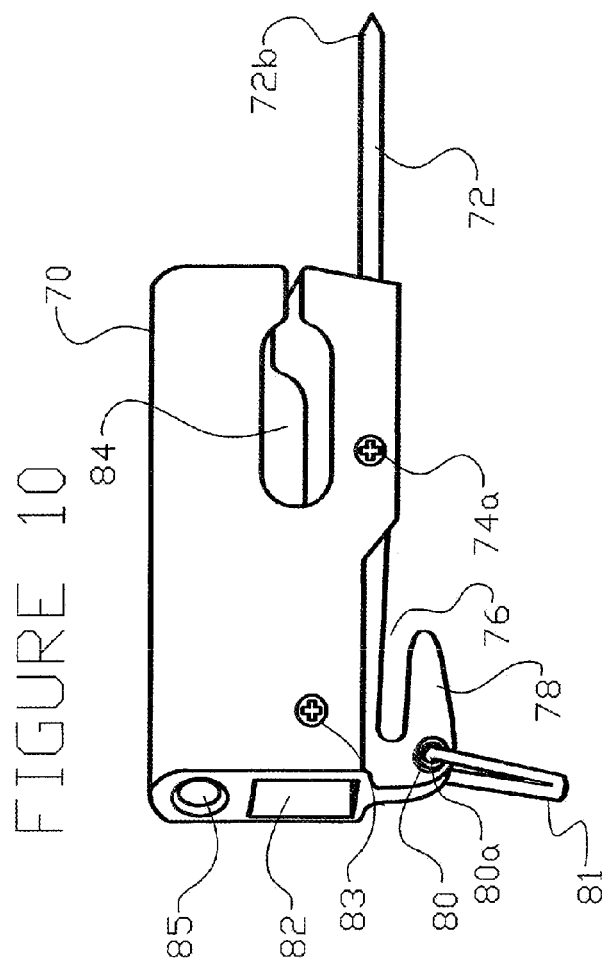
FIG. 10 is a detail perspective view of a muzzle assembly of the speargun of FIG. 1.

In studying this Detailed Description, the reader may be aided by noting definitions of certain words and phrases used throughout this patent document. Wherever those definitions are provided, those of ordinary skill in the art should understand that in many, if not most instances, such definitions apply to both preceding and following uses of such defined words and phrases. At the outset of this Description, one may note that the terms denoting positions or directions are defined with respect to a conventional orientation of a speargun. Thus, 'forward', 'front', 'ahead' denote relative proximity to a muzzle of the gun while 'rear', 'aft', 'back' and the like denote relative proximity to the butt of the gun.

A preferred speargun 160, as depicted in FIG. 1, comprises a grip assembly 2 linked to a muzzle assembly 70 by barrel 66 that is preferably wooden. When the speargun 160 is in use, a spear 64 is inserted through the muzzle assembly 70 and captured by a latch 54. One or more elastomeric bands 86 are stretched between the muzzle assembly 70 and the spear 64. A line 61 is commonly used to connect the spear 64 to the gun 160. In the depicted embodiment, one end of the line 61 is tied off to a press ring 81 and the other is attached to the spear 64 by a slidable linking element 120. The body of the line 61 is stored by being looped around a fixed line catch 78 portion of the muzzle 70 and a movable line drop member 60.

A preferred grip assembly 2 comprises two panels 2R, 2L that make up the main body of the speargun 160. There is a left side 2L and a right side 2R panel. These left and right panels are mirror images of each other. Once assembled, the speargun grip 2 becomes a very rigid, stable, and durable unit. In a specific preferred embodiment the grip assembly panels 2L, 2R are held together by six 1¼ inch long sex bolts 34, four ½ inch sex bolts 36, and two ¾ inch sex bolts 38.

On each side of the preferred grip assembly 2 there is a spare shaft holder 31 mounted to the grip assembly 2 using two stainless screws. The spare shaft holder 31 allows a diver to carry extra shafts on his speargun 160.

The butt area of a preferred speargun 160 has two accessory ports molded into the grip assembly 2. These ports can serve several purposes. An aft accessory port may be used to attach a small loop of heavy cord or monofilament. The diver attaches a float line to the loop for freediving or to tie off the gun when fighting a big fish. A forward accessory port can be used for the same purpose as the aft accessory port. The forward accessory port is approximately one half inch in diameter and is located just forward of the aft accessory port. The forward accessory port can also be used to carry a fish stringer shaped like a very large safety pin. The diver opens the stringer and threads the stringer through the forward accessory port and then closes the stringer. The forward accessory port can also be used to attach a tapered latex float line bungee which is typically used by freedive spearfishermen.

Further buoyancy control in a preferred speargun is provided by float pockets 44 molded into the grip assembly panels 2R, 2L and used to hold foam inserts. One of the float pockets 44 may be formed in the butt area of the grip assembly, directly in front of the butt pad 30. Another pocket 44 may be formed in the grip handle 32 and held in place with a plug 42.

A preferred release mechanism 150 comprises three major components: a trigger 52, a latch bar 54, and a trigger spring 56. The trigger 52 sits in a trigger boss in the grip assembly 2. A trigger reinforcing sleeve 52b sits in the trigger boss. A trigger pivot pin 52c sits in the trigger reinforcing sleeve 52b. A captive end of the trigger 52 pivots on the trigger pivot pin 52c which provides fore and aft pivotal motion of the trigger 52. The latch bar 54 pivots up and down on a latch bar pivot pin 54b supported by a latch bar reinforcing sleeve 54c which sits in the latch bar bosses formed in the grip panels. The trigger 52 and the latch bar 54 are connected by the trigger spring 56. The trigger spring 56 attaches to the trigger 52 at the trigger spring eye 56a and to the latch bar 54 at the latch bar spring eye 56*b*. The latch bar 54 engages the trigger 52 in the latch bar catch 53 The trigger spring 56 provides tension on the latch bar 54 to pull the latch bar 54 down and back when the latch bar 54 releases from the latch bar catch 53. When the latch bar releases from the latch bar catch 53, the trigger spring 56 pulls back on the latch bar 54 and the previously captured end of the latch bar 54 pivots up and forward, releasing the spearshaft 64. Before release the spearshaft 64 engages the latch bar 54 in the spearshaft notch 64*a*. The latch bar 54 also engages an anti-roll slot (not shown) on the end of the spearshaft 64 that is used to prevent the spearshaft 64 from rotating side to side. Side to side rotation of the spearshaft must be prevented to ensure the spearshaft 64 does not rotate.

In a preferred release mechanism a silencer O-ring 62 is mounted on a molded silencer O-ring stem 62*a*. When the latch bar 54 releases, the previously captured end of the bar pivots upward and hits against the silencer O-ring 62, which deadens the sound that would normally be made by the unprotected impact by the latch bar 54 against the bare/unprotected grip assembly 2. The silencer O-ring 62 greatly reduces the sound that a non protected trigger mechanism makes when the gun fires. Reducing or eliminating shot noise helps prevent spooking the fish before the shaft arrives at the intended target. The silencer O-ring 62 also performs another very important function. The silencer O-ring 62 reduces the upward travel distance of the latch bar 54. Limiting the upward travel of the latch bar 54 greatly reduces the amount of pressure required to reset the latch bar 54 into the latch bar catch 53. The shorter the distance the latch bar 54 has to travel to reset, the less pressure is required to reset the latch bar 54 into the latch bar catch 53. Soft reset pressure of the spearshaft is a very important and desirable feature on a speargun.

A preferred speargun comprises a safety mechanism 156 that can block aft movement of the trigger when in a "safe" position and allow movement of the trigger when in "fire". In a preferred safety mechanism 156 a safety cam 48 is pivotally confined in molded bosses formed in each side of the grip assembly panels 2R, 2L. The cam 48 rotates aft sufficiently to block the trigger 52 from pulling back far enough to release the latch bar 54 or rotates forward enough to allow the latch bar 54 to release from the latch bar catch 53. When the safety cam 48 is rotated to the "safe position", the safety cam blocks the aft movement of the trigger 52 from pulling back sufficiently to release the latch bar 54.

When the trigger 52 makes contact with the safety cam 48 it is very important to insure that the trigger 52 does not have a "rotational effect" on the safety cam 48 as this could cause unintended rotation of the safety cam 48 which could result in the safety cam 48 moving to the fire position resulting in an unintended release of the spearshaft 64. To ensure there is no rotational effect placed on the safety cam 48 by the trigger 52, a preferred mechanism comprises a trigger notch 53*a* cut into the back side of the trigger 52. With the safety cam 48 rotated to the "full safe position", if an operator pulls back on the trigger 52, the trigger 52 pivots backward and the trigger notch 53*a* engages a safety cam notch 48*c* which blocks the trigger 52 from traveling back far enough to release the latch bar 54. In addition, the trigger notch 53*a* engaging the safety cam notch 48*c* prevents a rotational effect on the safety cam 48 by the trigger 52. This prevents unintended release of the spearshaft 64.

In a preferred embodiment, each end of the safety cam 48 extends outwardly beyond the grip assembly panels 2R, 2L. Safety levers 50 can be mounted on each of these stems with a respective safety lever screw 50*a*. This creates a dual sided safety operable by a diver's thumb. The safety levers 50 are located in a natural ergonomic position relative to a user's natural thumb position. This enables the diver to comfortably move the safety lever to the full safe or full fire position with his thumb. The end of the safety stems, where the safety levers 50 mount have a flat and a keyway cut into the end. This creates a double key safety stem 48*a*. The double key safety stem 48*a* marries up with a corresponding safety flat and keyway 48*d* in the safety levers 50. The combined flat and keyway prevents the safety lever from stripping out when operated by the diver. The full range of motion of the safety levers 50 is controlled by a small protrusion called the safety lever stop 50*d* molded into the back side of the safety levers 50. The safety lever stop 50*d* sits in a small pocket molded into the side of each grip assembly panel 2 and is called the safety lever travel limiter 50*c*. A small amount of tension is required to keep the safety from rotating to the fire or safe position. This is provided by a safety tension O-ring 49. The safety tension O-ring 49 sits on the double key safety stem 48*a* on the immediate inside of the grip assembly panel 2. When the two sides of the grip assembly panels 2 are bolted together, this applies pressure to the face of the safety tension O-ring 49 and this pressure creates the necessary tension on the dual safety cam 48 to prevent unintended rotation of the safety cam 48. The tension on the safety levers 50 can be adjusted by tightening or loosening the safety lever screws 50*a*.

Although the preferred safety mechanism 156 provides ambidextrous operation, the reader will recognize that the invention is not so limited and that a single lever arrangement could be employed.

A preferred speargun 160 also comprises a line drop member 60 arranged to release a line cord 61 when the spearshaft 64 is released from the latch bar 54. One end of the line cord 61 is connected to the spearshaft 64 and the opposite end of the line cord 61 is attached to the triangle press ring 81. The bulk of the line cord can then be formed into a coil by wrapping it between the line drop member 60 and a line catch 78 formed on the muzzle assembly 70.

A preferred line drop 60 comprises a line drop stem 60*d* protruding from each side of the body of the line drop 60. Each line drop stem 60*c* sits in a line drop boss molded into a grip assembly panel. The line drop 60 pivots forward to release the line cord 61 and backward to reset the line drop 60 to the reload position. The reset action of the line drop 60 is accomplished with the line drop spring 58. One end of the line drop spring 58 is attached to the line drop 60 at the line drop spring hole 60*a*. The opposite end of the line drop spring 58 is attached to the spring boss pin 58*b* which is supported by spring bosses molded into the grip assembly panels.

In the reset position, a preferred line drop member 60 is contacted and held in position by the trigger 52. The contact point between the line drop 60 and the trigger 52 is the trigger/line drop contact point 60*c*. The contact angle of the trigger/line drop contact point 60*c* is such that when forward pressure is placed on the line drop 60 by the line cord 61 the contact angle between the line drop contact point 60*c* and the trigger 52 does not allow the line drop 60 to "push back" the trigger 52, which could cause unintended release of the spearshaft 64. In addition, there is a slight upward angle on the free end of the trigger 52 at the trigger/linedrop contact point 60*c*. This slight upward angle is designed to put forward pressure on the trigger 52 when forward pressure is applied to the line drop 60 by the line cord 61. This upward angle prevents the trigger 52 from having a rotational effect on the line drop member 60 in order to avoid unintended release of the spearshaft 64. The line drop 60 is ergonomically positioned well in front of the handle 28 to allow for a clear, unobstructed wrapping of the line cord 61.

A preferred muzzle 70 is installed on the front end of the wood stock 66. A flat area cut into the top of the wood stock 66 allows the wood stock to slip into the muzzle socket 82. A preferred muzzle 70 is held in place by two wood screws 83, one on each side of the muzzle 70. The muzzle 70 has a spearshaft bore hole 85 (preferably approximately one half inch in diameter) to receive the spearshaft 64. The preferred muzzle 70 has a band slot 84 having a size selected to allow the muzzle to hold up to four speargun bands 86.

A preferred muzzle assembly also provides a muzzle kill spike 72 which is intended to be used and to function in a similar manner to a bayonet on a rifle. The muzzle kill spike 72 is preferably installed in a kill spike hole 72c. The muzzle kill spike 72 is preferably sharpened to a tapered point 72b on one end, and has a spike mounting groove on the other end. When the muzzle kill spike 72 is inserted into the kill spike hole 72c it may be secured with a suitable screw 74 which acts as a cross pin and prevents the muzzle kill spike 72 from pulling out of the kill spike hole 72c.

A preferred muzzle assembly 70 also comprises a line catch 78 for receiving loops of the line cord 61. As previously noted, the line cord 61 may be wrapped between the line drop member 60 and the line catch 78 on the muzzle 70. An ergonomic line cord opening 76 is designed to act as an "automatic guide" to assist the diver in wrapping the cord onto the line catch 78. When the diver's hand contacts the muzzle 70 slightly above the ergonomic line cord opening 76, his/her hand is naturally guided into the line catch 78. This makes wrapping the line cord 61 almost fail safe. One end of the line cord 61 may be attached to the triangle press ring 81. The triangle press ring 81 installs in line boss hole 80a. Line boss 80 extends the width of line boss hole 80a. The split or open end of the triangle press ring 81 is inserted into line boss hole 80a and the triangle press ring 81 is then pressed closed inside the line boss 80, which secures the triangle press ring 81 in place. The preferred triangle press ring pivots fore and aft as the line cord 61 requires.

A preferred arrangement for connecting a line cord 61 to a spear 64 comprises, in combination, a protective member 90 disposed near the tip of the spear, a stopping member 130 disposed further aft closer to the spearshaft notch 64a and a linking element, or quick-slide adapter 120.

A preferred protective member 90 is a conical shaped device installed adjacent the end of a screw-on type speartip or on various types on one piece spearshafts. A significant purpose of the protective member 90 device is to protect the rivet pin 96 and barb or barbs 104 from being damaged if the spearshaft impacts a hard object like rock or metal. Previous speartips and spearshafts that do not have a protector cone 90 were subject to impact damage when the leading edge of the barbs 104 impacted rock or metal when the speargun fired. In this case the resulting impact can often bend the rivet pin 96 which causes the barb or barbs 104 to seize up, which could allow a fish to escape from the spearshaft. In extreme cases, a hard impact can shear off the rivet pin 96, resulting in the barbs 104 falling off the speartip or spearshaft. A preferred protector cone 90 thus has a diameter that is large enough to ensure that the protective cone extends further away from the spearshaft than does any portion of the barbs 104 and rivet pin 96. This arrangement offers effective protection against impact damage to the rivet pin 96 and the barbs 104 regardless of how severe the impact is. The protector cone essentially eliminates the possibility of impact damage to the barbs 104 and rivet pin 96 and thus greatly improves performance and reliability for the spearfisherman.

The reader will recognize that there are many ways in which a protector cone 90 can be installed on the speartip or spearshaft. These include, but are not limited to using any of a cross pin, glue, swedging, or welding. A preferred method is to use a shank thread so the protector cone 90 can be easily removed. In this arrangement the protector cone 90 has an inner protector cone thread 92 which screws onto the shank thread. The shank thread stops just in front of the barbs 104 and the protector cone 90 is tightened down on the shank thread. The protector cone 90 also increases the hydrodynamic efficiency of the spearshaft as it pushes through the water. The conical shape of the protector cone 90 reduces drag. Reduced drag increases shot distance and also produces a more accurate flight of the spearshaft. The protector cone 90 also increases the penetration of the spearshaft into the body of the fish with a continuous and symmetrical punch. The tip 100 pierces the fish, creating the initial entry point which creates a "pilot hole". Then the protector cone 90 impacts the pilot hole and smoothly punches through the fish in one clean, symmetrical motion. Once the protector cone 90 is in the fish, the remaining hardware on the speartip/spearshaft i.e. the barbs 104, the barb collar 106, and the tip bushing 108 slip through the fish without resistance because the protector cone is slightly larger in diameter than the remaining hardware. Previous speartip and spearshaft designs that did not have the protector cone required more power to force the spearshaft through the fish. The tip 100 would punch the initial hole and then the unprotected barbs 104 would have to tear a larger hole to finish punching through the fish. The exposed barbs 104 had a 90 degree edge at the leading edge. This produced more drag and did not allow the spearshaft to push through the water as efficiently. This increased drag required more power to drive the spearshaft through the fish. The protector cone eliminates these problems and therefore represents a significant improvement in the performance of the speargun.

The quick slide adapter 120 allows the user to quickly attach the line cord 61 to the spearshaft 64 by simply sliding the attachment eye 122 over the speartip and onto the body of the spearshaft 64. The inner diameter of the attachment eye 122 is slightly larger than the maximum diameter of the protector cone 90. This allows the quick slide adapter to pass over the protective cone and other equipment e.g. a speartip and barbs on the forward end of the spearshaft 64. The quick slide adapter 120 can also be used on speartips/spearshafts that do not have a protector cone 90. Once the quick slide adapter 120 is on the body of the spearshaft 64 the quick slide adapter 120 travels to the rear or aft end of the spearshaft 64 where it is captured by the stopping member 130, which may be a bullet slide ring. The shooting line attaches to the quick slide adapter 120 in the shooting line eye 124. The quick slide line system allows the user to quickly connect and disconnect the shooting line. This is a significant improvement over conventional line cord clips or disconnect systems.

The preferred bullet slide ring 130 is slightly larger in diameter than the attachment eye 122 on the quick slide adapter 120. The leading edge of the bullet slide ring 130 is conical in shape which increases the hydrodynamic efficiency of the spearshaft. The bullet slide ring 130 may be captured by a line swedge 136 which is pressed into the body of the spearshaft 64. The impact or trailing end of the bullet slide ring 130 has a conical bullet slide bevel 130a. The impact or trailing edge of the bullet slide ring 130a strikes against the forward or leading edge of the line swedge radius 136a. The trailing edge of the bullet slide ring 130a preferably has a concave bevel that matches the convex curve on the leading side of the line swedge radius 136a. The matching bevels of 130a and the curved radius of 136a ensure that the bullet slide ring 130 will not get stuck or wedge onto the line swedge 136 when they impact each other.

The quick slide adapter can also be used with other sorts of stopping members. For example, shark fin style spearshafts have planar tabs that are used to anchor the elastomeric bands. Shark fin shafts and others having planar tabs that are coplanar with the spearshaft do not require a bullet slide ring 130. In these cases the quick slide adapter or linking element 120 is captured by the forward edge of a shark fin tab 204.

Turning now to FIG. 11, one finds a grip kill spike 4 that is a hand held device used by a diver to kill a fish. In a preferred method of use a T-handle is held in the palm of the divers hand and secured with all five fingers. This T-handle 10 is preferably about 2¾ inches long and has a cross-sectional size of about ¾ inch square. In addition to the preferred plastic handle, a preferred kill spike comprises a steel rod 12 that is about 5½ inches long and about 5/16 inches in diameter. The preferred plastic T-handle 10 has a hole drilled at the midpoint of the 2¾ inch side to accept an end of the steel rod 12 that is preferably grooved to accept a screw to hold it into the handle. The opposite end of the steel rod 12 is sharpened to a tapered point 12b.

The grip kill spike 4 is preferably inserted into the grip assembly 2 and is held in place with a section of rubber tubing 16 that is about 1½ inches long and that has a nominal 5/16 inch inner diameter. The rubber tubing 16 is retained within a rubber tubing compartment 16a molded into the grip assembly panels 2R, 2L. The rubber tubing 16 is slightly smaller in diameter than the steel rod 12 so that when the steel rod 12 is inserted, the smaller diameter tubing applies a slight pressure on the steel rod 12 to hold the grip kill spike 4 in place. When the diver decides to use the grip kill spike 4, he pulls on the handle of the grip kill spike 4 and the grip kill spike 4 slides out of the grip assembly panels 2. To store the grip kill spike 4 the diver simply inserts the grip kill spike 4 back into the grip spike hole 13 in the grip assembly panels 2 and into the rubber tubing 16.

A preferred speargun 160 comprises a T-handle safety stop or retention boss 20 that is a small plastic ridge projecting outward from the grip assembly 2 by about ⅛ inch. The T-handle safety stop 20 acts a stop point in case the T-handle 10 was not fully inserted or accidently slid out of the rubber tubing 16. In a preferred embodiment, if the T-handle 10 slides back about ½ inch it comes in contact with the T-handle safety stop 20. This contact blocks any further movement of the grip kill spike 4. The T-handle safety stop 20 prevents the grip kill spike 4 from accidently falling out and potentially being lost.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

What is claimed is:

1. A release mechanism for a speargun having a grip portion, the release mechanism movable between a cocked state and a released state, the release mechanism comprising:
    a trigger having a captive end and a free end, the trigger pivotally attached, adjacent the captive end, to the grip portion;
    a latch bar pivotally attached to the grip portion, the latch bar having a first end captured by the trigger when the mechanism is in the cocked state, the latch bar having a second end protruding outwardly from the grip portion when the mechanism is in the cocked state;
    a coil spring extending between the trigger and the latch bar; and
    a line drop member pivotally attached to the grip portion, the line drop member having a first end engaging the free end of the trigger and a second end depending below the grip portion when the mechanism is in the cocked state.

2. A release mechanism for a speargun having a grip portion, the release mechanism movable between a cocked state and a released state, the release mechanism comprising:
    a trigger having a captive end and a free end, the trigger pivotally attached, adjacent the captive end, to the grip portion;
    a latch bar pivotally attached to the grip portion, the latch bar having a first end captured by the trigger when the mechanism is in the cocked state, the latch bar having a second end protruding outwardly from the grip portion when the mechanism is in the cocked state; and
    a line drop member pivotally attached to the grip portion, the line drop member having a first end engaging the free end of the trigger and a second end depending below the grip portion when the mechanism is in the cocked state; wherein
    the grip portion comprises two mirror image grip panels providing a cavity therebetween and wherein the pivotal attachments of the trigger, the latch bar and the line drop member to the grip portion comprise rods extending between the mirror image grip panels.

* * * * *